United States Patent [19]

Castaneda

[11] 4,101,234
[45] Jul. 18, 1978

[54] SHOPPING CART THEFT-CONTROL APPARATUS

[76] Inventor: Ernesto G. Castaneda, 7934 Lou Dillon, Los Angeles, Calif. 90001

[21] Appl. No.: 788,618

[22] Filed: Apr. 18, 1977

[51] Int. Cl.² .............................................. E01F 13/00
[52] U.S. Cl. ...................................................... 404/6
[58] Field of Search .................... 404/6, 1; 256/1, 13.1

[56] References Cited

U.S. PATENT DOCUMENTS

| | | | |
|---|---|---|---|
| Re. 26,203 | 5/1967 | Greenfield | 256/1 |
| 3,459,280 | 8/1969 | Grimm | 404/6 X |
| 3,993,006 | 11/1976 | Connolly | 109/1 R |

*Primary Examiner*—Nile C. Byers

*Attorney, Agent, or Firm*—Francis X. LoJacono, Sr.

[57] ABSTRACT

A shopping cart theft-control apparatus arranged to prevent the unauthorized removal of shopping carts from the parking area surrounding a market or store in which carts are employed, the parking lot defining a restricted enclosed area having separate entrance and exit portals for pedestrians and vehicles, wherein the pedestrian portals include a plurality of vertical poles forming passage spaces less than the width of the carts, and wherein the vehicle portals comprise a base structure having laterally disposed bar elements equally spaced apart in parallel relation to receive the wheels of the cart therein, thus preventing the cart from passing therethrough.

1 Claim, 4 Drawing Figures

SHOPPING CART THEFT-CONTROL APPARATUS

BACKGROUND OF THE INVENTION

1. Field of the Invention

This invention relates generally to a shopping cart and, more particularly, to a means for preventing the unauthorized removal or theft of shopping carts from store parking areas.

2. Description of the Prior Art

As is well known in the art, several problems and difficulties are encountered in providing suitable means for preventing the unauthorized removal and theft of shopping carts.

Various apparatuses and safetly systems have been tried and are now in actual use. However, most apparatuses have been rather restrictive and very costly to implement. Further, the various restrictive systems that are presently employed irritate the shopper, particularly those that have barriers of fences immediately surrounding the store building. With these barriers the shopping carts cannot be taken to the parking lot at all; and, thus, a person having large quantities of groceries must leave his cart parked along the store perimeter while he first goes to pick up his car and brings it to where his cart was left standing. During peak shopping hours, this can cause delay because customers in their cars will be lined up waiting to pick up their groceries. Also, there is the ever present possibility that someone might steal unattended groceries or merchandise left standing—and which have already been paid for.

Because of the above problems, there has been a sharp decline in business where such a system has been employed.

Various mechanical apparatuses have also been employed; but these also have not been proven to be successful, due to the fact that they limit carts from being used in the parking areas.

However, U.S. Pat. No. 3,772,994 discloses a shopping-cart-control system that allows the carts to be taken to parked cars in the surrounding store parking lots. In this arrangement, the cart is connected by a chain to a member slidably mounted in a track, the track being disposed in the ground of the parking area.

Another method of preventing theft of carts is where the cart is provided with a brake unit, allowing the cart to be wheeled only relatively short distances, at which time the brake automatically engages a cooperating surface, preventing any further movement of the cart.

SUMMARY OF THE INVENTION

The present invention is so arranged that it will allow unrestricted movement throughout the parking area, wherein only a low wall barrier is positioned surrounding the parking lot—this wall or fence generally already being provided at most markets.

This walled area includes a plurality of entrance and exit portals of two types. One portal provides a passage for pedestrians therethrough, and yet restricts the shopping cart by including a plurality of vertical posts disposed in the opening forming the pedestrian passage, each post being spaced apart so as to prevent the passage of carts therethrough.

The portal arrangement for vehicles provides a base structure defining a threshold along the ground surface of an opening in the wall, said threshold having a plurality of laterally positioned rails mounted in the base structure in a parallel arrangement, wherein the space between each rail will readily receive and capture the wheels of a cart.

To provide added protection, the wall is extended along each side of the rail ends, thereby further restricting the egress of carts while allowing free movement thereover by the exiting and entering vehicles.

OBJECTS AND ADVANTAGES OF THE INVENTION

The present invention has for an important object a provision wherein shopping carts can be readily used in a normal manner in and out of the market building, and freely moved about the grounds of the adjacent parking area, without the unauthorized removal from the premises.

It is another object of the invention to provide a shopping cart theft-control apparatus that prevents the removal of shopping carts from a parking area but does not hinder egress or ingress of both predestrians and vehicles.

It is still another object of the invention to provide an apparatus of this character that is relatively inexpensive to install, service and maintain.

It is a further object of the invention to provide an invention of this type that has no operating parts.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only.

DESCRIPTION OF THE PREFERRED EMBODIMENT

Figure 1:
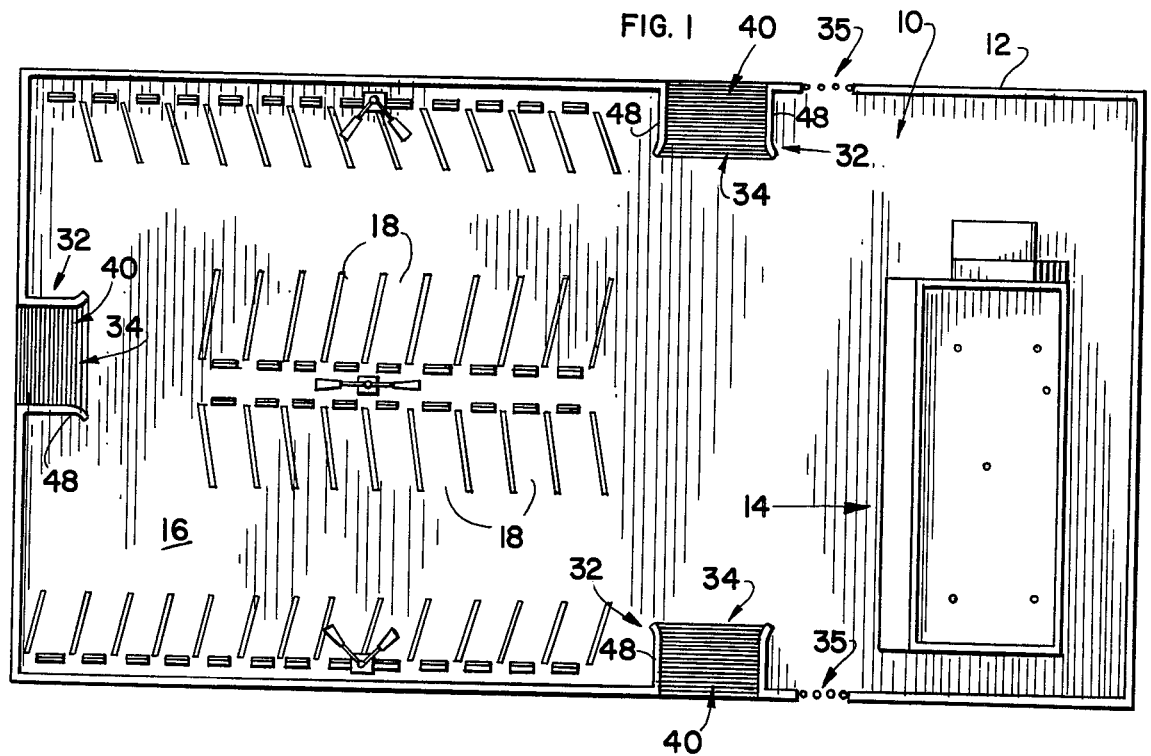
FIG. 1 is a plan view of a store and the surrounding restricted parking area.

Referring more particularly to FIG. 1, there is shown a plan view arrangement of an enclosed area, generally indicated by 10, said area being defined by a peripheral wall structure 12 in which is located a market or store, indicated at 14, having a parking area 16 for the costumers, including the usual layout marking indicating parking spaces 18.

As hereinbefore stated, shopping carts are used not only to collect items therein while shopping but are used to carry the groceries or merchandise from the store or market 14 to vehicles parked within area 16. Thus, to prevent the unauthorized removal of these carts, various restricting means are herein employed.

Figure 2:
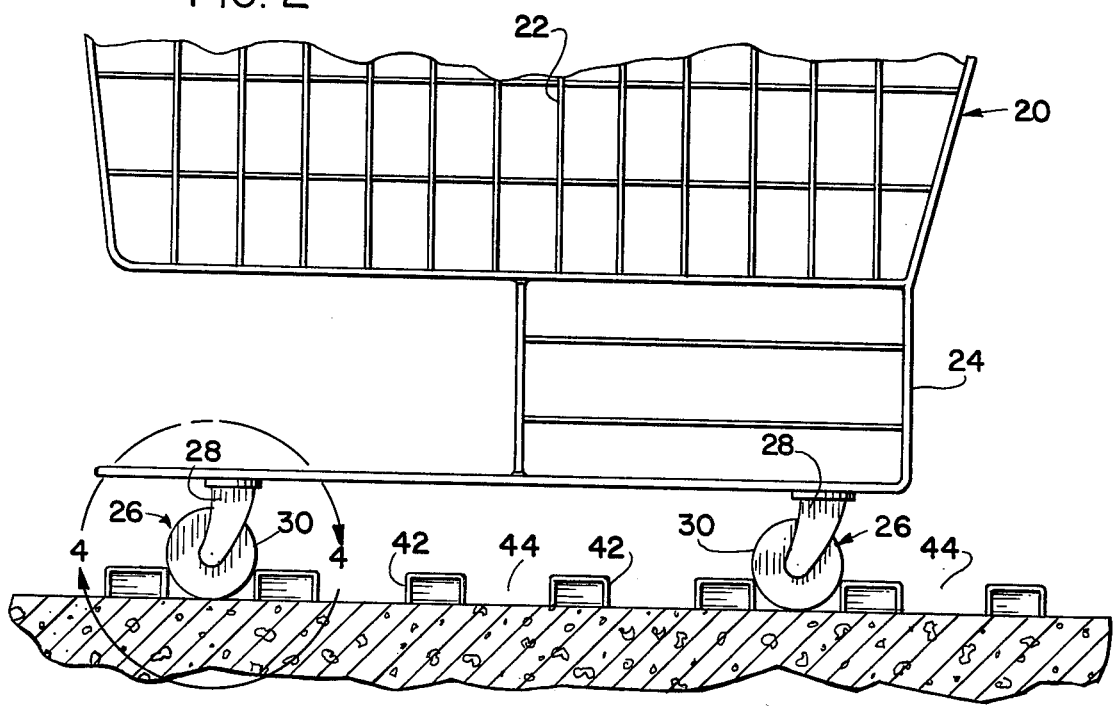
FIG. 2 is a longitudinal cross-section of the vehicle threshold having a shopping cart positioned therein.

Before any further description, it should be understood that the disclosed apparatus is to be employed to restrict shopping carts of the well-known, conventional type, indicated generally at 20 in FIG. 2, having a wiretype basket 22 supported by frame structure 24, to which is affixed casters 26. The casters are of any conventional types generally supplied with such carts, having a rotating wheel-support element 28. Wheel-support element 28 includes a typical rotatable wheel 30. Generally, wheels 30 are provided with diameters from 4 to 4 ¾ inches.

Accordingly, the shopping cart and its related elements are only by way of general illustration, since various known carts provide many types and sizes. However, the conventional cart has a width greater than 22 inches. The above dimensions of the average cart are important to the operability of the present invention—in that no changes or additional elements need be added to the conventional shopping cart. Thus, the cart can be used in a normal manner, as long as there is no attempt to remove it from the area restricted by the peripheral wall 12.

Wall 12 includes a plurality of entrance-and-exit portals which are defined by openings in sections of the wall structure, wherein the openings indicated at 32 are driveway entrances having the cart-restraining means 34 formed as a part thereof.

The additional portals located along the wall structure are pedestrian accessways 35, whereby foot traffic is allowed therethrough, but including means to prevent passage therethrough of said carts 20.

Figure 3:
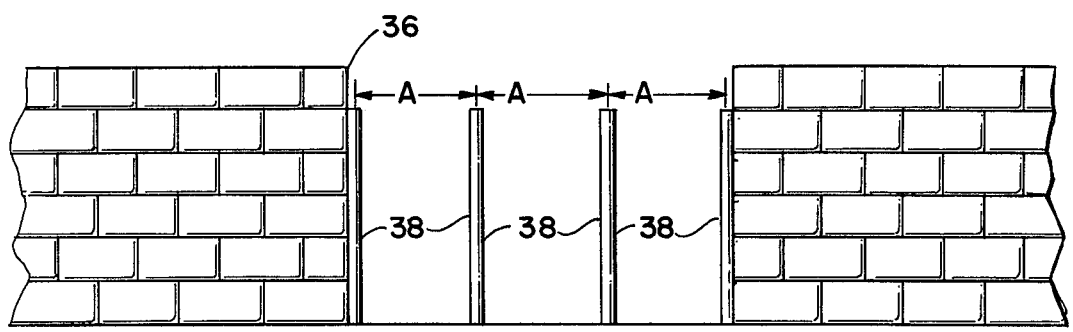
FIG. 3 is an elevational view of a pedestrian portal formed along the wall structure.

Each pedestrian accessway is more clearly illustrated in FIG. 3 comprising wall opening 36 having a plurality of vertical post members 38 of any suitable configuration, wherein the posts are spaced apart at approximately 22 inches, as indicated at A. This, then, will allow individuals to readily pass therebetween, but will prevent the average size cart from passing therethrough.

Figure 4:
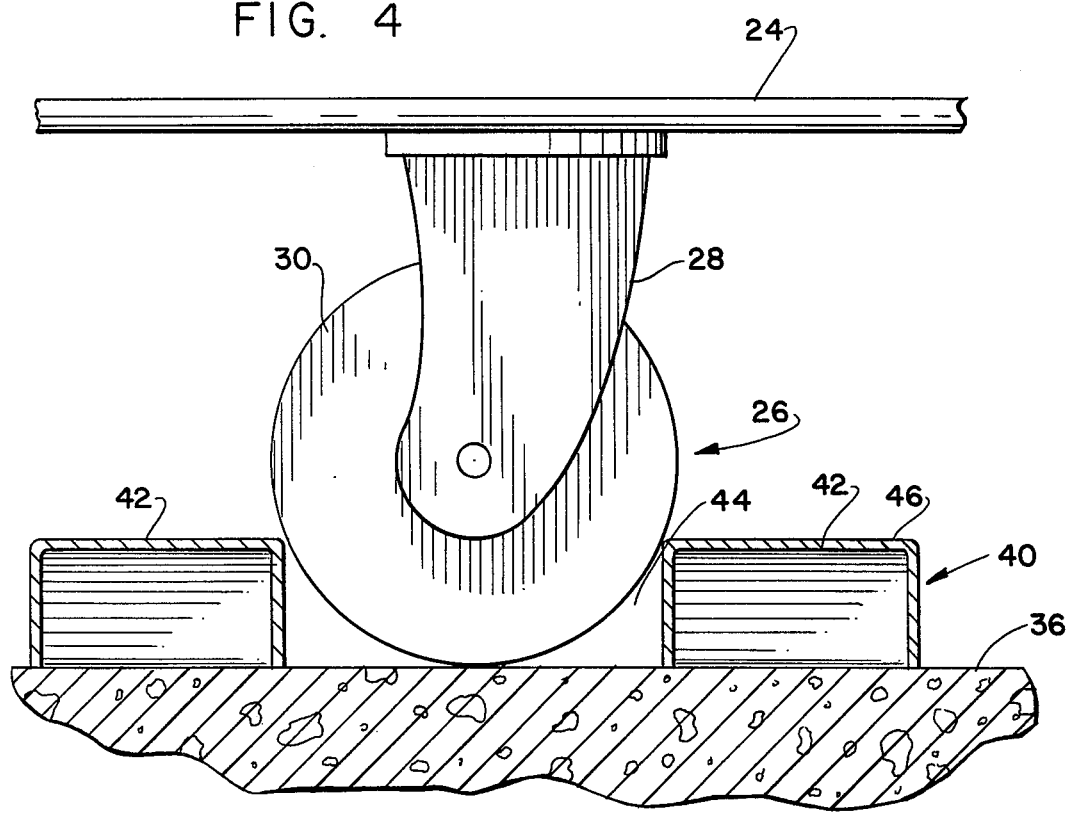
FIG. 4 is an enlarged cross-sectional view of a pair of restraining bars having the caster wheels of a cart captured therebetween.

Referring now to the driveway entrance 34 and to FIGS. 2 and 4, there is shown an enlarged, cross-sectional view of a portion of said driveway, wherein there comprises a base-support structure 36 defining an apron formed from any suitable material, but preferably having a concrete base with a width cabable of allowing entrance and exit of the various size vehicles.

Included and affixed to or within said base structure 36 is means for preventing the carts from traversing the driveway. That is, shopping carts are prevented from being rolled over the entrance surface and removed from the restricted area 16 because of the arrangement of the removal-preventive means, generally indicated at 40. Said removal-preventive means 40 comprises a plurality of equally-spaced, juxtaposed bar members 42 arranged laterally across the width of said base structure 36.

Thus, elongated wells 44 are defined between the parallel bar members, the width of said wells being approximately four and a half inches so as to entrap wheels 30 of casters 26 between said bar members. The depth of the well is determined by the height of bars 42 which is approximately between 1½ and 1¾ inches. Thus, the average wheels associated with shopping carts will come to rest in space 44 and become locked between bars 42 as seen in FIG. 4.

Bar members 44 can be of several configurations; however, it has been found that the most suitable design for the most economical and simplest construction is that wherein the bar member is formed from elongated channel members secured into the base structure 36, and wherein the flat upper surface wall 46 is provided with a width of at least 3 inches. Hence, with a 3 inch surface and a 4½ spacing, vehicles of all types may traverse the driveway entrance, without any difficulty or adverse effect.

To further prevent unauthorized removal of said carts, wall structure 12 is extended inwardly, as at 48, defining a boundary-barrier means along opposite longitudinal sides of the driveway, whereby each bar member terminates adjacent the barrier walls 48 forming said barrier means. Thus, if a cart is to be removed from area 16, it must be lifted over wall 12 or carried over the entire length of the entranceway 34.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A shopping cart theft-control apparatus wherein said cart is prevented from being removed from a restricted area surrounding a shopping facility, wherein said apparatus comprises:

a peripheral wall structure defining said restricted area;

a plurality of driveway entrances arranged to allow egress and ingress for various sizes of vehicles;

a plurality of pedestrian portals formed in said peripheral wall structure;

means provided within said pedestrian portal to prevent said cart from passing therethrough, said means comprising a plurality of vertical post members equally spaced apart wherein the width of the spaces therebetween prevents carts from passing therethrough, yet it is wide enough to allow pedestrian traffic therethrough;

means disposed in said driveway entrance for preventing said cart from traversing said driveway entrance, wherein said means comprises:

a stationary base structure defining an apron, a plurality of bar members laterally disposed and affixed in said apron, said bar members being arranged in a juxtaposed, spaced, parallel relationship to one another, wherein said bar members comprise an elongated channel member affixed in said apron having a pair of side walls and a top surface wall substantially spaced above the surface of said apron.

restraining wells defined by spaces formed between each of said bar members, said wells being adapted to receive various sizes of caster wheels associated with said carts, whereby said wheels are locked within said restraining wells by engaging respective bar members forming said wells, wherein the width of said wells is between 4 to 4½ inches and wherein the depth thereof is between 1 to ½ inch, a boundary barrier comprising a pair of oppositely disposed and inwardly extending wall structures formed from said peripheral wall structure, wherein each extending wall structure is disposed along the terminating ends of said bar members; and wherein said resricted area thereof comprises a vehicle parking lot, whereby said shopping carts are freely movable therein to allow said carts to be transported without restriction to the parked vehicles.

* * * * *